No. 708,997. Patented Sept. 16, 1902.
M. C. CARTER.
TIRE FOR VEHICLE WHEELS.
(Application filed May 12, 1902.)
(No Model.)

Witnesses
OM Simpson
H. F. Riley

M. C. Carter Inventor
by C A Snow & Co
Attorneys

UNITED STATES PATENT OFFICE.

MANSION C. CARTER, OF HEARNE, TEXAS.

TIRE FOR VEHICLE-WHEELS.

SPECIFICATION forming part of Letters Patent No. 708,997, dated September 16, 1902.

Application filed May 12, 1902. Serial No. 106,991. (No model.)

*To all whom it may concern:*

Be it known that I, MANSION C. CARTER, a citizen of the United States, residing at Hearne, in the county of Robertson and State of Texas, have invented a new and useful Tire for Vehicle-Wheels, of which the following is a specification.

The invention relates to improvements in tires for vehicle-wheels.

The object of the present invention is to improve the construction of tires for vehicle-wheels and to provide a simple, inexpensive, and efficient construction adapted to increase the strength and durability of vehicle-wheels and capable of enabling a felly-section and a spoke to be readily detached and renewed without removing the other parts of the wheel.

The invention consists in the construction and novel combination and arrangement of parts hereinafter fully described, illustrated in the accompanying drawings, and pointed out in the claims hereto appended.

Figure 1:
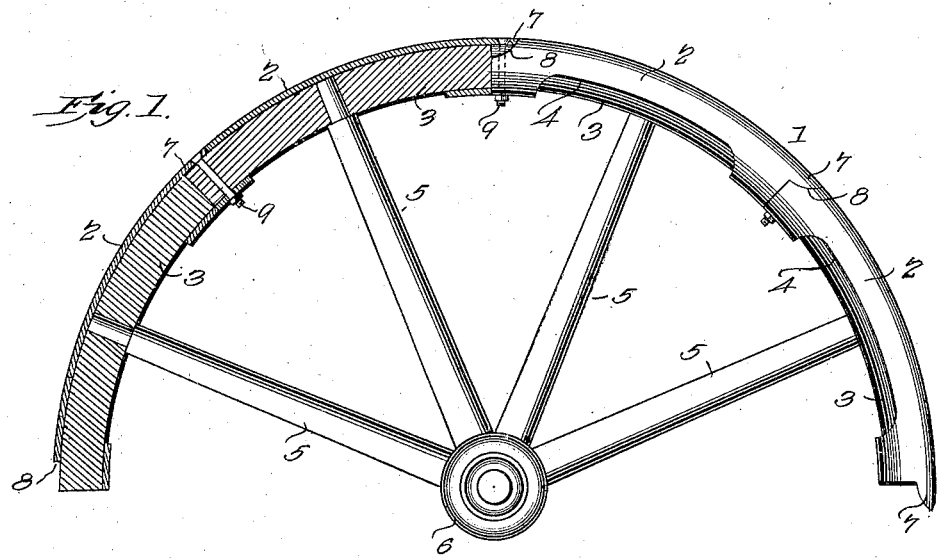
Figures 2, 3:
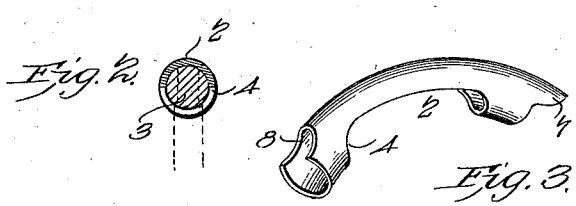
Figure 4:
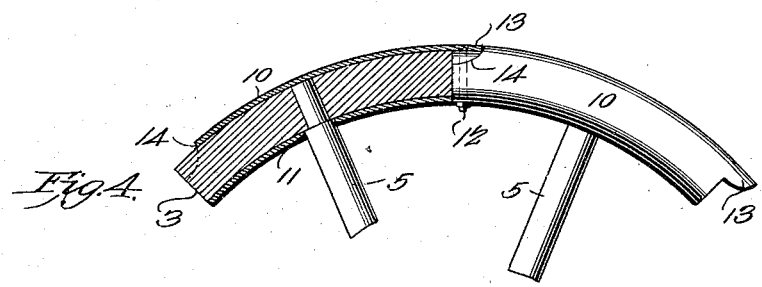
Figure 5:

In the drawings, Figure 1 is an elevation, partly in section, of a portion of a vehicle-wheel constructed in accordance with this invention. Fig. 2 is a transverse sectional view of a felly-section and a tire-section. Fig. 3 is a detail perspective view of one of the tire-sections. Fig. 4 is a detail view illustrating a modification of the invention. Fig. 5 is a transverse sectional view of the same.

Like numerals of reference designate corresponding parts in all the figures of the drawings.

1 designates a tire composed of a series of approximately tubular sections 2, arranged on round felly-sections 3 and adapted to reinforce and support the same and provided at the inner sides of the felly-sections with longitudinal openings 4 to lighten the construction; but the tubular sections may be made continuous, as illustrated in Figs. 4 and 5 of the accompanying drawings. The felly-sections are round or circular in cross-section and are provided with sockets to receive the outer ends of spokes 5, which may be secured to the hub 6 in any suitable manner. The tire-sections, which are preferably thickened at their outer portions or treads, are each provided at one end with a projecting tongue or extension 7, and it has a corresponding cut-away portion or recess 8 at its other end to receive the tongue of the adjacent tire-section. The sections of the tire are united by tire-bolts 9, which extend through perforations of the tongues and through the adjacent felly-sections and through the recessed ends of the tire-sections. The heads of the bolts are countersunk in the tongues, and nuts are provided at the inner faces of the felly-sections. When it is desired to renew a spoke or a felly-section, the adjacent tire-bolts are removed, which will enable the tire-section, the inclosed felly-section, and the spoke to be detached. The projecting tongues fit in the recesses 8, and the outer faces of the sections of the tire are flush and form a continuous unbroken tread.

In Figs. 4 and 5 of the accompanying drawings is illustrated a modification of the invention in which tire-sections 10 are employed, and these tire-sections, which are tubular, are continuous throughout their entire length, as clearly shown in Fig. 4, and they are provided with suitable apertures 11 for the outer ends of the spokes. These sections 10 are connected by tire-bolts 12, which pass through overlapping tongues 13 and through recessed ends 14 of the sections. The recesses conform to the configuration of the tongues, similar to those heretofore described.

It will be seen that the wheel is simple and comparatively inexpensive in construction, that its strength and durability are greatly increased by the reinforcing tubular tire-sections, which prevent the felly-sections from splitting, and that the tire and felly sections may be readily detached when it is desired to remove and renew a spoke or a felly-section.

What I claim is—

1. In a wheel, the combination with felly-sections, of tubular tire-sections receiving the felly-sections and detachably connected at their ends, substantially as and for the purpose described.

2. In a wheel, the combination with felly-sections, of the tubular tire-sections surrounding and reinforcing the felley-sections and provided with projecting overlapping tongues, and fastening devices passing through the tongues and through the adjacent sections, substantially as described.

3. In a wheel, the combination with felly-sections, of the tubular tire-sections surrounding the felly-sections and forming a continuous tread and provided at the inner faces of the felly-sections with openings, substantially as described.

4. In a wheel, the combination with round felly-sections, of the tubular tire-sections provided at their inner sides with longitudinal openings and having recesses at one end and provided with projecting tongues located at the other end and fitting in the said recesses, and fastening devices passing through the tongues and through the adjacent sections, substantially as described.

In testimony that I claim the foregoing as my own I have hereto affixed my signature in the presence of two witnesses.

MANSION C. CARTER.

Witnesses:
H. C. SHAW,
W. C. TILLERY.